US010245608B2

(12) United States Patent
Dufault et al.

(10) Patent No.: US 10,245,608 B2
(45) Date of Patent: Apr. 2, 2019

(54) METHOD FOR FLOW CONTROL CALIBRATION OF HIGH-TRANSIENT SYSTEMS

(71) Applicant: Graco Minnesota Inc., Minneapolis, MN (US)

(72) Inventors: Peter N. Dufault, Saint Paul, MN (US); Todd A. Anderson, Elk River, MN (US)

(73) Assignee: Graco Minnesota Inc., Minneapolis, MN (US)

(*) Notice: Subject to any disclaimer, the term of this patent is extended or adjusted under 35 U.S.C. 154(b) by 189 days.

(21) Appl. No.: 15/306,921

(22) PCT Filed: Apr. 28, 2015

(86) PCT No.: PCT/US2015/027919
§ 371 (c)(1),
(2) Date: Oct. 26, 2016

(87) PCT Pub. No.: WO2015/168074
PCT Pub. Date: Nov. 5, 2015

(65) Prior Publication Data
US 2017/0043366 A1 Feb. 16, 2017

Related U.S. Application Data

(60) Provisional application No. 61/987,255, filed on May 1, 2014.

(51) Int. Cl.
*G05D 7/06* (2006.01)
*B05B 12/14* (2006.01)
(Continued)

(52) U.S. Cl.
CPC ............ *B05B 12/1427* (2013.01); *B05B 9/04* (2013.01); *B05B 9/0406* (2013.01);
(Continued)

(58) Field of Classification Search
CPC ........ Y10T 137/2499; Y10T 137/7761; G05D 7/0623; B05B 12/088; B05B 12/1427
(Continued)

(56) References Cited

U.S. PATENT DOCUMENTS 4,019,653 A 4/1977 Scherer et al.
4,324,366 A 4/1982 Geier et al.
(Continued)

FOREIGN PATENT DOCUMENTS

CN 101622506 A 1/2010
CN 102186675 A 9/2011
(Continued)

OTHER PUBLICATIONS

International Search Report and Written Opinion for Application Serial No. PCT/US2015/027919, dated Jul. 20, 2015, 10 pages.
(Continued)

*Primary Examiner* — Kevin F Murphy
(74) *Attorney, Agent, or Firm* — Kinney & Lange, P.A.

(57) ABSTRACT

A method of controlling a flow rate includes selecting an operating condition defined by an operating flow rate and an operating pressure, comparing the operating flow rate to a threshold flow rate, and executing an adaptive calibration routing if the operating flow rate is greater than or equal to the threshold flow rate. The adaptive calibration routine includes measuring the operating pressure, measuring a first flow rate through a first meter, and modifying a pressure-flow table based on the operating pressure and the first flow rate.

11 Claims, 3 Drawing Sheets

(51) Int. Cl.
  *B05B 9/04* (2006.01)
  *B05B 12/08* (2006.01)

(52) U.S. Cl.
  CPC ......... *B05B 12/088* (2013.01); *G05D 7/0623*
  (2013.01); *Y10T 137/2499* (2015.04); *Y10T*
  *137/7761* (2015.04)

(58) Field of Classification Search
  USPC ........................................................ 700/282
  See application file for complete search history.

(56) References Cited

U.S. PATENT DOCUMENTS

| | | | |
|---|---|---|---|
| 4,487,367 | A | 12/1984 | Perry et al. |
| 4,562,088 | A | 12/1985 | Navarro |
| 4,602,653 | A * | 7/1986 | Ruiz-Vela ............. A61M 16/12 |
| | | | 128/204.22 |
| 4,614,300 | A | 9/1986 | Falcoff |
| 4,720,807 | A | 1/1988 | Ferran et al. |
| 4,848,657 | A | 7/1989 | Hashimoto et al. |
| 4,858,172 | A | 8/1989 | Stern |
| 4,877,051 | A | 10/1989 | Day |
| 5,107,441 | A | 4/1992 | Decker |
| 5,182,704 | A | 1/1993 | Bengtsson |
| 5,197,800 | A | 5/1993 | Saidman et al. |
| 5,215,253 | A | 6/1993 | Saidman et al. |
| 5,330,783 | A | 7/1994 | Saidman et al. |
| 5,520,333 | A | 5/1996 | Tofte |
| 5,609,136 | A | 3/1997 | Tuken |
| 6,112,137 | A | 8/2000 | McCarty et al. |
| 6,149,071 | A | 11/2000 | MacCallumMhor et al. |
| 6,223,645 | B1 | 5/2001 | Elberson |
| 7,004,402 | B2 | 2/2006 | Borders et al. |
| 7,114,517 | B2 * | 10/2006 | Sund ..................... G01F 1/8413 |
| | | | 137/487.5 |
| 7,363,100 | B2 | 4/2008 | Skelton-Becker et al. |
| 7,603,186 | B2 | 10/2009 | Smirnov |
| 7,706,926 | B2 | 4/2010 | Peterson |
| 7,798,167 | B2 * | 9/2010 | Ohmi .................... G05D 16/208 |
| | | | 137/487.5 |
| 8,082,946 | B2 | 12/2011 | Laverdiere et al. |
| 8,915,262 | B2 * | 12/2014 | Smirnov .............. G05D 7/0635 |
| | | | 137/486 |
| 8,920,574 | B2 * | 12/2014 | Bhaumik ............... A61B 1/123 |
| | | | 134/18 |
| 2004/0104244 | A1 | 6/2004 | Cline et al. |
| 2004/0262428 | A1 | 12/2004 | Wulteputte |
| 2008/0047611 | A1 | 2/2008 | Stemer |
| 2008/0262650 | A1 | 10/2008 | Dorendorf et al. |
| 2009/0194604 | A1 | 8/2009 | Smith |
| 2012/0009329 | A1 | 1/2012 | Mather et al. |
| 2012/0168004 | A1 | 7/2012 | Terrier |
| 2012/0173027 | A1 | 7/2012 | Cheng et al. |
| 2012/0203475 | A1 | 8/2012 | Wilkens et al. |
| 2013/0146148 | A1 | 6/2013 | Smirnov |
| 2014/0005841 | A1 | 1/2014 | Cheng et al. |

FOREIGN PATENT DOCUMENTS

| | | |
|---|---|---|
| CN | 102856570 A | 1/2013 |
| DE | 2819302 B2 | 12/1980 |
| DE | 3423094 A1 | 1/1986 |
| EP | 0741349 A2 | 11/1996 |
| EP | 1481736 A2 | 12/2004 |
| JP | 2003290709 A | 10/2003 |
| KR | 20090027273 A | 3/2009 |
| WO | WO 0234417 A1 | 5/2002 |

OTHER PUBLICATIONS

International Search Report and Written Opinion for Application Serial No. PCT/US2015/027955, dated Jul. 27, 2015, 13 pages.
Extended European Search Report for EP Application No. 15785894.5, dated Nov. 28, 2017, 10 pages.
Extended European Search Report for EP Application No. 15786269.9, dated Nov. 28, 2017, 5 pages.
Chinese Office Action for CN Application No. 2015800156703, dated May 11, 2018, 5 pages.

* cited by examiner

METHOD FOR FLOW CONTROL CALIBRATION OF HIGH-TRANSIENT SYSTEMS

BACKGROUND

The present invention relates generally to controlling one or more system parameters and, more particularly, to methods for flow calibration of transient systems.

Industrial systems that control various system parameters (e.g. pressure, flow rate, temperature, and the like) often encounter various system disturbances. In order to maintain the system within established parameters, the control scheme for the system is designed to respond to environmental changes and variable properties of fluids or materials contained within the system. Such control systems often detect and counteract gradual changes in the system through monitoring parameters critical to system performance.

Some industrial systems utilize sprayers to dispense material (e.g. paint, adhesive, epoxy, and the like) at a specific pressure and flow rate. In systems that operate continuously or for relatively long periods of time at a single pressure and flow rate, the pressure and flow rate reach steady state. Thus, minor changes in the material and/or system performance can be carefully monitored and counteracted by a conventional control scheme.

However, when such systems operate at multiple pressure and flow rate combinations in which some conditions operate for relatively short durations, the pressure and flow rate do not reach steady state. Pressure and flow rate changes and/or fluctuations during transient periods within the system are problematic for control systems because conditions are different at the sprayer outlet than at measurement locations within the system. Failing to account for these transient conditions can result in over-dispensing or under-dispensing material.

In some traditional control schemes, transient periods are controlled by segregating system operating conditions and performing a calibration routine prior to performing each operation. However, calibration routines increase manufacturing costs and disrupt manufacturing work flow because production pauses during the calibration routine. In other traditional control schemes, transient periods are controlled by dispensing excess material until the system reaches steady state. Once the system is at steady state, the traditional control scheme is capable of accounting for minor disturbances. However, dispensing excess material increases material costs.

Therefore, a need exists for controlling the pressure and flow rate of an industrial system that can cost-effectively adapt to multiple operating conditions, environmental changes, and transient conditions.

SUMMARY

A method of controlling a flow rate includes selecting an operating condition defined by an operating flow rate and an operating pressure, comparing the operating flow rate to a threshold flow rate, and executing an adaptive calibration routine if the operating flow rate is greater than or equal to the threshold flow rate. The adaptive calibration routine includes measuring the operating pressure, measuring a first flow rate through a first meter, and modifying a pressure-flow table based on the operating pressure and the first flow rate.

DETAILED DESCRIPTION

Figure 1:
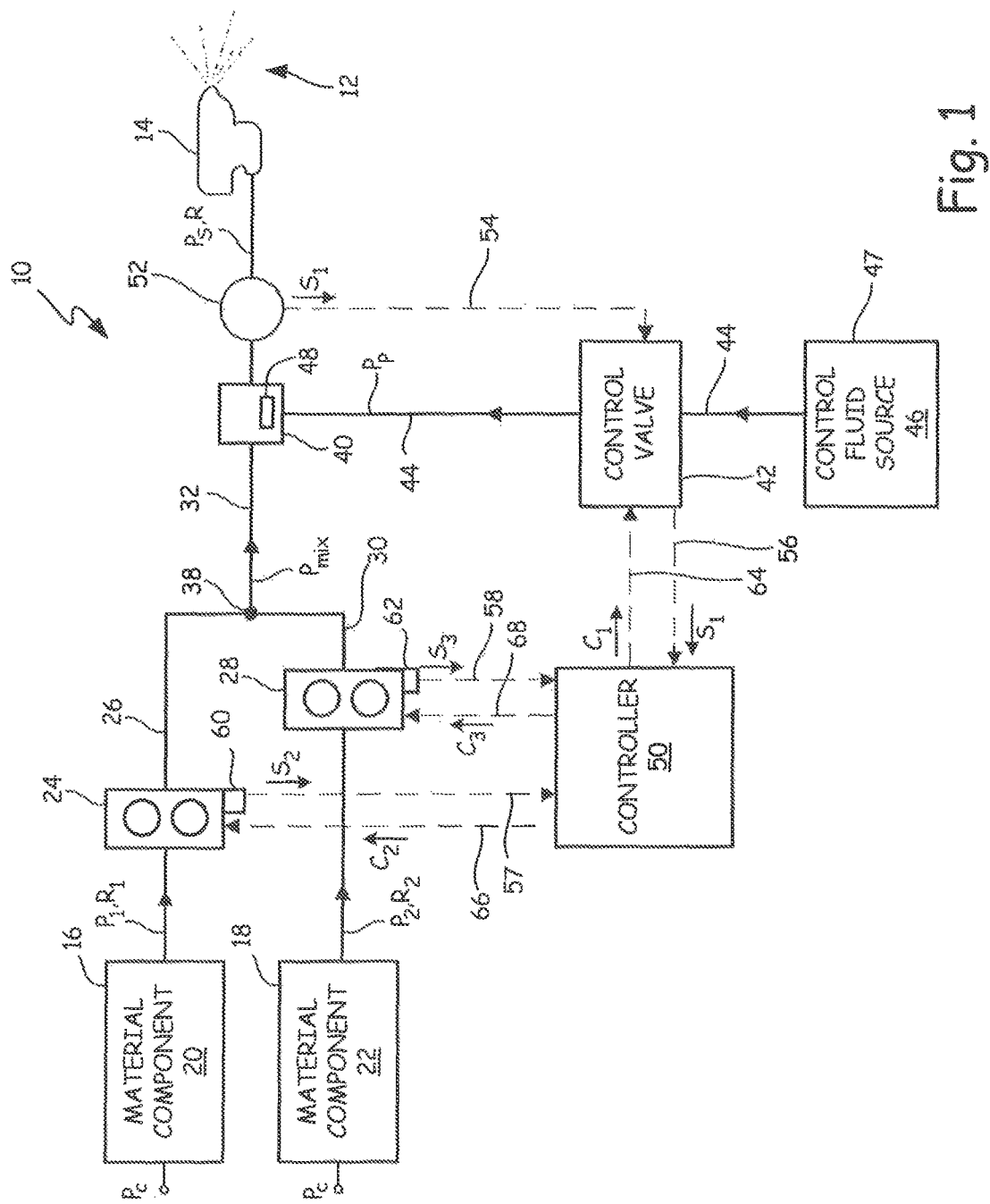
FIG. 1 is a schematic diagram showing an industrial sprayer system.
Figure 2:
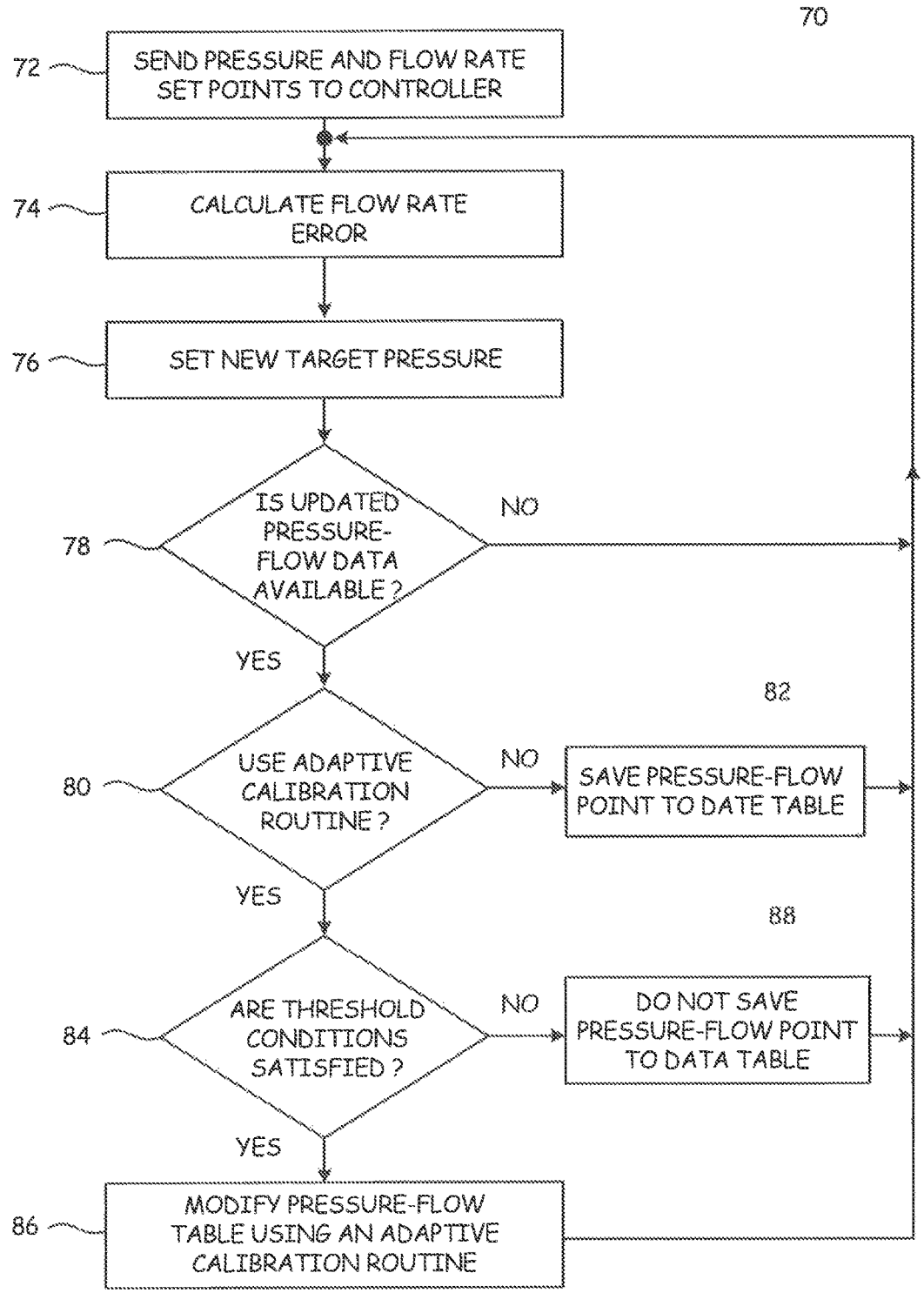
FIG. 2 is a flow chart showing a method for controlling a flow rate of the industrial sprayer system in FIG. 1.

FIG. 1 is a schematic diagram of industrial system 10, such as a passive proportioner system, for dispensing mixed material 12 from sprayer 14. Industrial system 10 includes, among other components described hereafter, material supply systems 16 and 18, which contain material components 20 and 22, respectively. Material supply system 16 is fluidly connected to meter 24 with supply line 26, and material supply system 18 is fluidly connected to meter 28 with supply line 30. Material supply system 16 acts on material component 20 to increase its pressure from initial pressure P0 to supply pressure P1. Similarly, material supply system 18 acts on material component 22 to increase its pressure from initial pressure P0 to supply pressure P2. Material supply systems 16 and 18 can be pressurized tanks containing material components 20 and 22, respectively. Alternatively, material supply systems 16 and 18 can include feed pumps or other circulating components that act on material components 20 and 22, respectively. As such, initial pressure P0 can range from ambient pressure (0 kPa gage) to pressure suitable for supplying material components 20 and 22, typically about 2068 kPa gage (300 psig). Additionally, P0 for material supply system 16 does not necessarily equal P0 for material supply system 18. Meters 24 and 28 are disposed along supply lines 26 and 30, respectively. Supply lines 26 and 30 fluidly connect material supply systems 16 and 18, respectively, to mixed material line 32 at junction 34 where supply lines 26 and 30 join. Mixed material line 32 fluidly connects supply lines 26 and 30 at junction 38 to spray gun 14. Meters 24 and 28 are arranged in parallel and cooperate to supply material components 20 and 22 to mixed material line 32 where components 20 and 22 combine to form mixed material 12 having mixed pressure Pmix. Meters 24 and 28 supply mixed material 12 to spray 14 at flow rate R where it is selectively dispensed. Pressure regulator 40 is disposed along mixed material line 32 to reduce mixed pressure Pmix to system pressure Ps prior to dispensing mixed material 12 from spray gun 14. Adjustment of supply pressure Ps is accomplished by using control valve 42 to vary pilot pressure Pp. Control valve 42 is disposed along control pressure line 44, which contains control fluid 46 and extends from control fluid source 47 to pressure regulator 40. Control fluid 46 acts on diaphragm 48 of pressure regulator 40 to modify supply pressure Ps when system 10 is in a closed state. An increase in pilot pressure Pp increases system pressure Ps due to force application of diaphragm 48 on mixed material 12. A decrease of pilot pressure Pp decreases system pressure Ps due to a force reduction from diaphragm 48 on mixed material 12. When diaphragm 48 reduces force applied to mixed material 12, it acts on control fluid 46. Pilot pressure Pp of control fluid 46 is maintained by allowing a portion of control fluid 46 to return to control fluid source 47. In some embodiments, pressure regulator 40 is an air-operated, low flow pressure regulator having a pilot pressure to supply pressure ratio equal to 1:1.

Supply pressure Ps and flow rate R are managed by controller 50. Pressure transducer 52 disposed downstream from pressure regulator 40 produces signal S1, which is a voltage or current of pressure transducer 52. Signal line 54 electrically connects pressure transducer 52 to control valve 42, and signal line 56 electrically connects control valve 42 to controller 50, each signal line transmitting signal S1 to controller 50. Signal lines 57 and 58 electrically connect flow rate sensors 60 and 62 to controller 50, respectively. Flow rate sensor 60 detects flow rate R1 flowing through meter 24, and flow rate sensor 62 detects flow rate R2 flowing through meter 28. Flow rates R1 and R2 are transmitted to controller 50 in the form of signals S2 and S3 respectively, which like signal S1, are voltage or currents from sensors 60 and 62, respectively. Based on values of signals S1, S2, and S3, controller 50 executes a control scheme to modify flow rates R1 and R2 flowing through meters 24 and 28, respectively, and to modify supply pressure Ps by commanding control valve 42 to change pilot pressure Pp. Material component 20, flowing at flow rate R1, combines with material component 22, flowing at flow rate R2, within mixed material line 32 to produce mixed material 12, flowing at flow rate R. Controller 50 modifies pilot pressure Pp by sending control signal C1 to control valve 42 with control line 64 and modifies flow rates R2 and R3 by sending control signals C2 and C3 to meters 24 and 28 with control lines 66 and 68, respectively.

Transient conditions exist within system 10 when actuating spray gun 14 to close system 10, which is typically accomplished with an air-actuated solenoid valve (not shown in FIG. 1) or a trigger of spray gun 14 (not shown in FIG. 1). Because flow rates are measured at meters 24 and 28 and not at spray gun 14, changes of supply pressure Ps and flow rate R lag changes to pilot pressure Pp and flow rates R1 and R2. If controller 50 causes pressure regulator 40 to maintain a constant system pressure Ps when system 10 is closed, then the pressure at spray gun 14 increases due to the lack of flow-based pressure drop within system 10. Subsequently, when system 10 is opened (i.e. from opening the solenoid valve or trigger within spray gun 14), a burst of flow, driven by the prior pressure increase, causes non-uniform application of mixed material 12. If controller 50 causes pressure regulator 40 to increase system pressure Ps while system 10 is closed, then effects from a burst flow are amplified. When controller 50 causes system pressure Ps to decrease while system 10 is closed, hysteresis effects increase the error between the target pressure and system pressure Ps. The resulting system pressure Ps will not dispense mixed material 12 from spray gun 14 at the desired flow rate R.

Moreover, material property and/or environmental changes impact supply pressure Ps and flow rate R during operation. For example, material components 20 and 22, respectively, are periodically replenished. Because newly added material components 20 and 22 can have different temperatures from each other and from the previously dispensed materials, properties such as viscosity can affect flow rate R as supplied to sprayer 14. Additionally, mixed material 12 can partially cure within mixed material line 32 and, over time, foul mixed material line 32. As such, mixed material line 32 is periodically cleaned with solvents. Environmental changes such as ambient temperature and humidity changes also affect the properties of material components 20 and 22. However, system 10 is designed to operate over a range of supply pressures Ps and a range of flow rates R, each operating condition having duration.

Some spraying applications involve several discrete operating conditions. For example, three operating conditions could be used in sequential order: 1) dispense 100 cc/min at 68.9 kPA (about 10 psi) for 10 seconds, 2) dispense 200 cc/min at 137.9 kPa (about 20 psi) for 15 seconds, and 3) dispense 50 cc/min at 34.5 kPa (about 5 psi) for 2 seconds. Without the aid of method 70 described below, the transient conditions of system 10 are counteracted by performing repeated calibration procedures and/or by discharging mixed material 12 between operating points until steady state conditions are present within system 10. Both methods result in additional manufacturing costs and/or wasted mixed material 12. However, method 70 as described below characterizes flow rate R by monotonic mathematical relationships to approximate flow rate R at different system pressures Ps. This allows for a smaller number of less-intrusive data points to be collected to characterize the entire calibration. Additionally, if operation at a flow rate reaches steady state (i.e., operates longer than a threshold duration), steady state pressure and flow rate data can be used to modify the calibration without the need for a separate calibration cycle. FIG. 2 is a flow chart showing method 70 for calibrating system 10 and like industrial systems characterized by transient conditions. Method 70 includes steps 72, 74, 76, 78, 80, 82, 84, 86, and 88, which allow a pressure-flow table to be modified in process when system 10 is operated at multiple conditions for a single application. The pressure-flow table relates system pressure Ps, the dependent variable, to flow rate R, the independent variable, for mixed material 12.

Step 72 includes selecting and sending a pressure set point and a flow rate set point to controller 50. The specific pressure and flow rate set points are based on the requirements of mixed material 12, for instance, as explained in the previously described example.

After establishing a flow rate set point, step 74 determines the flow rate error. The current flow rate R within system 10 is equal to the flow rates R1 and R2 flowing through meters 24 and 28, respectively. In other embodiments of system 10, a single meter (e.g. meter 24) can be used or additional meters (not shown) can be used depending on the number of components used to form mixed material 12. In each case, flow rate R dispensed from spray gun 14 is equal to the summation of each component flowing through one or more meters included in system 10. To determine the flow rate signal error, controller 50 compares the flow rate set point to the total flow rate R of system 10. The flow rate signal error is the difference between the flow rate set point and flow rate R. Using the flow rate signal error, controller 50 updates a pressure-flow table and determines a new pressure set point in step 76. The pressure-flow table is stored within controller 50.

Step 78 involves determining if updated pressure-flow data is available (i.e., from previously executed steps 80, 86

In step 80, controller 50 determines whether to execute an adaptive calibration routine. Typically, the adaptive calibration routine will be executed if the planned application includes low flow, short duration operating conditions (e.g., operating condition 3 in the above example). The specific flow rate and duration will be system specific. Generally, a low flow, short duration operating conditions occur when transient conditions of system 10, or other like system, prevent acquisition of data suitable to control the system. If an adaptive calibration routine is not executed, the pressure and flow rate set points are saved to the pressure-flow table in step 82. Following step 82, controller 50 executes step 74 and the subsequent steps as described hereafter. If the adaptive calibration routine is executed, then steps 84 and 86 or steps 84 and 88 are performed.

Step 84 involves determining whether threshold conditions exist to modify the pressure-flow table in step 86. In some embodiments, step 84 involves comparing the flow rate set point to a threshold flow rate. If the target flow rate is greater than or equal to the threshold flow rate, the current flow rate R and system pressure Ps are saved to the pressure-flow table in step 86. If the target flow rate is less than the threshold flow rate, the pressure-flow table is not modified in step 88 with the current flow rate R and system pressure Ps. Instead, the pressure-flow table, which may have been previously modified by a prior step 86, is used to evaluate the pressure-flow condition. This is accomplished by using the pressure-flow data above the threshold flow rate to extrapolate the pressure-flow data below the threshold flow rate. Typically, the extrapolation routine uses a linear relationship. However, other mathematical relationships can be used. Following steps 86 and 88, the controller executes step 74 and the subsequent steps as described above.

Figure 3:
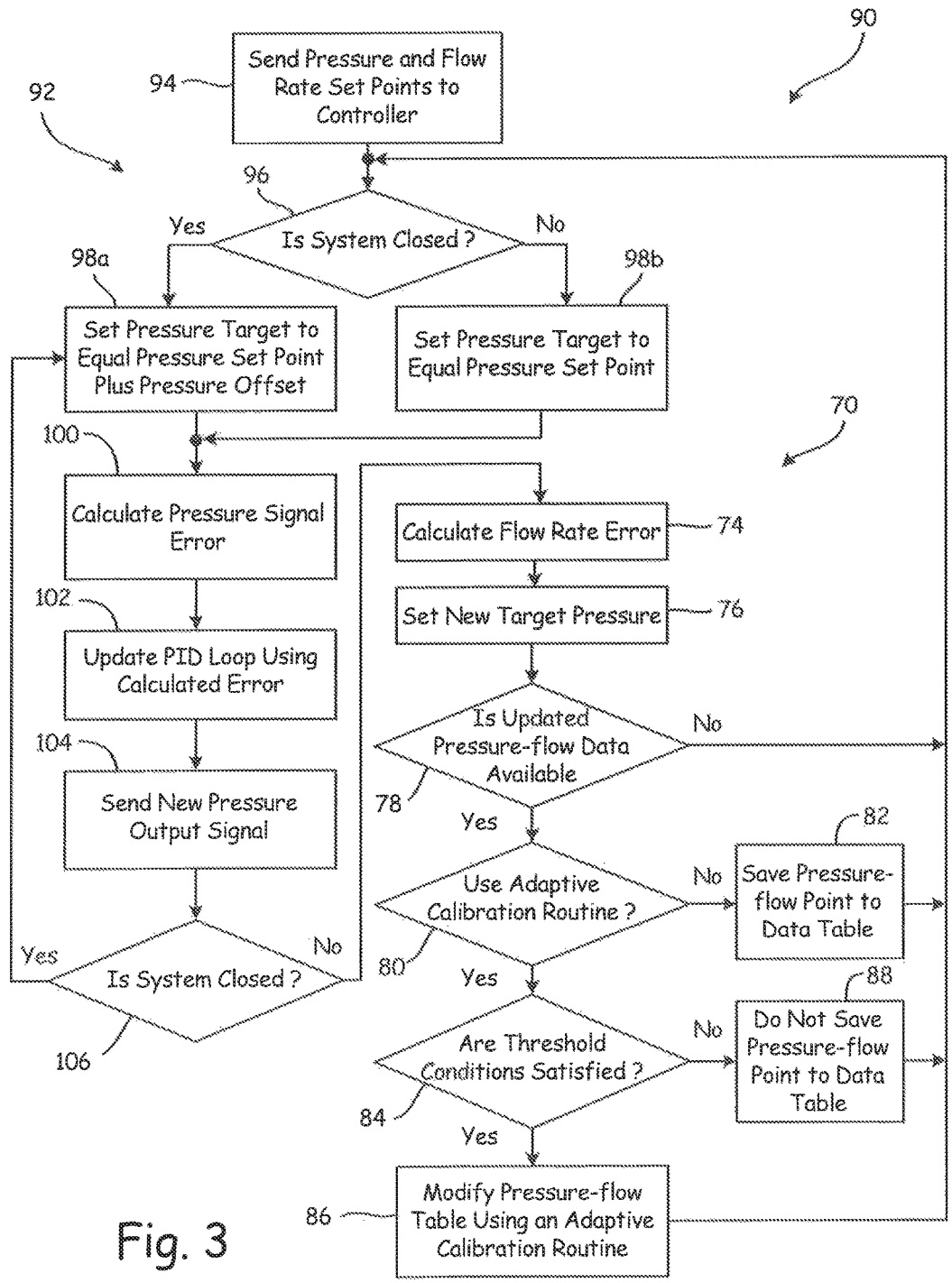
FIG. 3 is a flow chart showing a method for controlling a flow rate and the pressure of the industrial system in FIG. 1

Using the flow rate threshold simplifies method 70 because flow rates R1 and R2 are already measured at meters 24 and 28. Additionally, system pressure Ps is proportional to flow rate R within an industrial system such as system 10, higher system pressures generally producing higher flow rates R. As system pressure Ps and flow rate R increase, the duration required to attain steady state operation decreases. This consequence lends to selecting a flow rate threshold to differentiate long duration operations from short duration operations because low pressure, short duration operations produce the longest transient periods within system 10. FIG. 3 is a flow chart showing method 90 of controlling system pressure Ps and flow rate R of system 10. Method 90 incorporates every step of method 70 except for step 72, which is the same as step 94 of method 92. Method 92 is a method of controlling system pressure Ps when system 10 is in a closed state.

Step 94 includes selecting and sending a pressure set point and a flow rate set point to controller 50. The specific pressure and flow rate set points are determined based on the requirements of mixed material 12, for instance, as explained in the previously described example.

In step 96, controller 50 determines the state (e.g., closed or open) of system 10. The controller can make this determination by receiving signals that communicate the position of the trigger or solenoid valve of spray gun 14. If system 10 is closed, step 98a is performed. Step 98a establishes a target pressure at spray gun 14 that is equal to the pressure set point plus a pressure offset. The pressure offset is selected to offset the effects of increasing or decreasing the pressure set point relative to the previously selected set point, as previously described above. Optionally, the pressure offset can also counteract the initial pressure drop within system 10 when spray gun 14 is opened. If system 10 is open, step 98b is performed. Because spray gun 14 dispenses mixed material 12 when system 10 is open, offsetting the target pressure is not necessary. Thus, step 98b establishes a target pressure equal to the pressure set point.

After establishing a target pressure, step 100 involves calculating the pressure signal error. The pressure signal error is determined by receiving signal S1 from pressure transducer 52 at controller 50 and comparing signal S1 to the target pressure. The difference between signal S1 and the target pressure is the pressure signal error, which is stored over time in controller 50.

In step 102, the pressure signal error is used to update the PID loop. Proportional-integral-derivative loops or PID loops are known in the art. Updating the PID loop involves adding the current signal error to a data set of prior collected pressure signal error values. Next, the accumulated pressure signal error values along with parameters inputted into the controller while tuning the controller initially are used to create a new pressure output signal C1. Output signal C1 is transmitted to control valve 42 in step 104.

In step 104, output signal C1 causes control valve 42 to increase or decrease pilot pressure Pp thereby changing system pressure Ps using pressure regulator 40. For example, if the pressure signal error indicates that the pressure target is less than current system pressure Ps, then controller 50 will transmit signal C1 commanding control valve 42 to increase pilot pressure Pp. Conversely, if the error indicates that the target pressure is greater than current system pressure Ps, then controller 50 will transmit signal C2 commanding control valve 42 to decrease pilot pressure Pp.

Following step 104 is step 106 in which controller 50 determines the state of system 10 for a second time. The manner in which controller 50 determines the state of system 10 is substantially similar to step 96. If system 10 is closed, steps 98a, 100, 102 and 104 are repeated. If system 10 is open, controller 50 performs method 70 as previously described except, instead of repeating the steps of method 70 as previously described, the steps of method 92 are performed until the state of system 10 is open in step 106.

Although the present invention has been described with reference to preferred embodiments, workers skilled in the art will recognize that changes may be made in form and detail without departing from the spirit and scope of the invention.

The invention claimed is:

1. A method of controlling a flow rate includes:
   selecting an operating condition defined by a flow rate set point and a pressure set point;
   comparing the flow rate set point to a threshold flow rate;
   executing an adaptive calibration routine if the flow rate set point is greater than or equal to the threshold flow rate, wherein the adaptive calibration routine includes:
   measuring an operating pressure;
   measuring a first flow rate through a first meter;
   storing the operating pressure and the first flow rate;
   modifying a pressure-flow table based on the operating pressure and the first flow rate; and
   causing the first meter to operate at the first flow rate.

2. The method of claim 1 and further including:
   executing an extrapolation routine if the flow rate set point is less than the threshold flow rate, wherein the extrapolation routine includes:
   measuring the operating pressure;
   using the pressure-flow table to calculate the first flow rate based on the operating pressure; and
   causing the first meter to operate at the first flow rate.

3. The method of claim 2, wherein the adaptive calibration routine further includes:
   measuring a second flow rate through a second meter, wherein the first flow rate plus the second flow rate equal a total flow rate;
   storing the second flow rate; and
   modifying the pressure-flow table based on the operating pressure, the first flow rate, and the second flow rate.

4. The method of claim 3, wherein the extrapolation routine further includes:
   using the pressure-flow table to calculate the second flow rate based on the operating pressure; and
   causing the second meter to operate at the second flow rate.

5. The method of claim 2, wherein the pressure-flow table is linearly extrapolated to determine the first flow rate.

6. The method of claim 1, wherein comparing the flow rate set point and the threshold flow rate includes:

selecting the threshold flow rate corresponding to a threshold duration; and comparing the flow rate set point to the threshold flow rate.

7. The method of claim 6, wherein the threshold flow rate is between a maximum flow rate and a minimum flow rate corresponding to a plurality of operating conditions.

8. The method of claim 7, wherein the threshold flow rate is an average of the maximum and minimum flow rates.

9. The method of claim 6, wherein the threshold duration is four seconds.

10. The method of claim 1, wherein the operating pressure is measured downstream from a pressure regulator.

11. The method of claim 1, wherein the operating pressure and the first flow rate are stored in a controller, and wherein the controller uses the stored operating pressure and the first flow rate to modify the pressure-flow table.

\* \* \* \* \*